July 24, 1956  N. BRUNZEL  2,756,114

PRESSURE LUBRICATING BEARING

Filed Sept. 19, 1950

INVENTOR.
NORBERT BRUNZEL
BY
ATTORNEYS

United States Patent Office 2,756,114
Patented July 24, 1956

2,756,114
PRESSURE LUBRICATING BEARING

Norbert Brunzel, Leverkusen-Wiesdorf, Germany, assignor to Farbenfabriken Bayer Aktiengesellschaft, Leverkusen, Germany Application September 19, 1950, Serial No. 185,545

Claims priority, application Switzerland September 27, 1949

2 Claims. (Cl. 308—9)

The present invention relates to a pressure lubricating bearing for machines and apparatuses consisting of a bearing body which is provided with channels or the like for the supply of a lubricant under pressure, for instance, air, gas, steam or a fluid, the channels emanating from one chamber and ending on the running surface of the bearing. The pressure of the lubricant supplied through the channels thereby is so high that a lubricating film is maintained which takes up the load of the bearing. With the known pressure lubricating bearings of this kind, for instance, air bearings of ultra centrifuges the vertically arranged rotor is unilaterally lifted by the dynamic pressure of the compressed air introduced into the annular clearance of the bearing through channels, and kept in balance. This kind of structure of the bearing cannot be used for normal bearings of machines and apparatuses.

According to the present invention the supply channels for the lubricant standing under pressure emanate from one chamber and end on the running surface of the bearing on the loaded side of the bearing and in opposite direction thereto, whereby the annular clearance between the bearing and the shaft serves as outlet for the lubricant. The cross section of the annular clearance is larger than the effective total cross sections of the channels, that are the cross sections that determine the quantity of the lubricant.

In this manner on the loaded as well as on the unloaded side of the bearing a lubricating film is maintained, the supply channels acting as automatic hydraulic openings in such a manner that if the clearance on the loaded side of the bearing becomes smaller a higher pressure is exerted on the lubricating film; at the unloaded side of the bearing therefore a larger clearance is formed and the pressure on the lubricating film at that place is reduced, always provided, however the bearing is not overloaded.

The channels ending on the loaded side of the bearing as well as the channels ending in opposite direction thereto may emanate from one chamber. The effect of the hydraulic automatic regulation and the carrying capacity of the lubricant may be improved if the channels ending on the loaded side of the bearing and the channels ending in opposite direction thereto, emanate from a chamber of their own. The lubricant is then preferably introduced into the channels on the loaded side of the bearing from the chamber with a higher pressure, and into the channels on the unloaded side of the bearing from the chamber with a lower pressure. In this manner the pressure differences of the lubricant being decisive for the carrying capacity are still further increased between lower and upper clearance.

One structure of the bearing according to the present invention consists in that the bearing body has at least two bearing boxes which are tightly placed beside each other and are provided with narrow slitted channels at the contacting surfaces. These channels may be radially or spirally formed.

The bearing body may also consist of at least two bearing boxes arranged beside each other at slight distance, so that a narrow annular slit for the supply of the lubricant is formed. By axially movably arranging at least one of the bearing boxes the width of the slits between two adjacent bearing boxes may be adjusted at will.

In the accompanying drawings the invention is illustrated in principle and by way of example.

Figure 1:
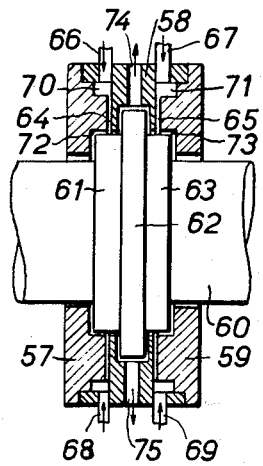
Fig. 1 is a longitudinal section of a bearing consisting of bearing boxes axially arranged beside each other at small distances so that narrow slits are formed between them serving for the supply of the lubricant.

Fig. 1 is a vertical cross section through a pressure lubricating bearing according to the invention consisting of bearing boxes 57, 58, and 59. The shaft 60 is equipped with collars 61, 62, and 63. Between the bearing boxes 57 and 58 there is a clearance 64, and between the bearing boxes 58 and 59 there is a clearance 65. The lubricant enters the annular channels 70, 71 at 66, 67, 68, and 69, it passes through the annular clearance 64 and 65 into the slits of the bearing 72, 73, from which it escapes to the outside at the sides as well as through the openings 74 and 75.

Figure 2:
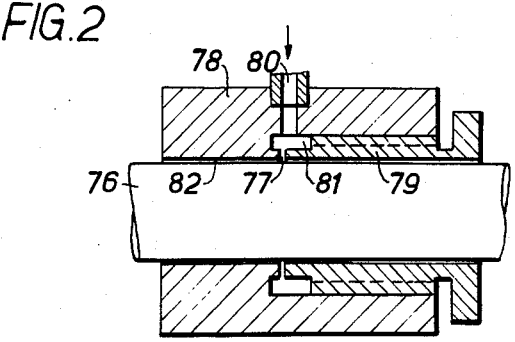
Fig. 2 is a longitudinal section through a pressure bearing. One part of the bearing is movably arranged so that the clearance between the movable and immovable parts of the bearing can be changed as to its width.

Fig. 2 shows a pressure lubricating bearing according to the invention which consists in that the annular clearance through which the lubricant standing under pressure is introduced into the clearance of the bearing, is displaceably arranged as to its width. 76 is the shaft, 77 is the annular clearance which is formed by the stationary part of the bearing 78 and the movable part of the bearing 79. The lubricant is introduced at 80 and passes from the pressure chamber 81 through the clearance 77 into the slit 82 between the shaft 76 and the parts of the bearing 78 and 79. By axial displacement of the movable part of the bearing 79 compared with the stationary part of the bearing 78 the width of the clearance 77 may be adjusted as desired.

The fact that with a pressure lubricating bearing according to the invention the automatic maintainance of the lubricating film occurs with a stationary bearing as well as with a rotating axial movement of the bearing leads to using this kind of bearing also for to and fro movements, for instance occurring in compressor pistons, regulating valve shafts, and the like.

I claim:

1. Pressure lubricating bearing comprising at least two bearing boxes axially arranged one beside the other in spaced relation to define an annular clearance therebetween, with at least one of said bearing boxes being movably arranged for varying said annular clearance defined between it and said other bearing box, said annular clearance emanating from an annular pressure chamber and terminating at the inner surface of the bearing boxes.

2. Pressure lubricating bearing comprising at least two bearing boxes defining an inner bearing surface axially arranged in spaced relation to define an annular clearance therebetween, said annular clearance emanating from and in free circumferential communication with an annular pressure chamber positioned outward of said inner bearing surface and terminating at the inner surface of the bearing boxes.

References Cited in the file of this patent

UNITED STATES PATENTS

| 603,260 | Cook | May 3, 1898 |
| 846,796 | Kruesi | Mar. 12, 1907 |
| 1,416,988 | Sherwood | May 23, 1922 |
| 1,622,136 | Dworack | Mar. 22, 1927 |
| 2,049,343 | Warren | July 28, 1936 |
| 2,486,227 | Tydeman | Oct. 25, 1949 |
| 2,502,173 | Potts | Mar. 28, 1950 |